Nov. 4, 1969 SHINTARO OSHIMA ET AL 3,476,878

TIME-DIVISION SYNCHRONOUS SYSTEM FOR A PLURALITY OF SYNCHRONOUS TELEGRAPH CIRCUITS

Filed March 7, 1967 5 Sheets-Sheet 1

United States Patent Office 3,476,878

Patented Nov. 4, 1969

3,476,878

TIME-DIVISION SYNCHRONOUS SYSTEM FOR A PLURALITY OF SYNCHRONOUS TELEGRAPH CIRCUITS

Shintaro Oshima, Yukio Nakagome, and Yasuo Fukata, Tokyo-to, Japan, assignors to Kokusai Denshin Denwa Kabushiki Kaisha, Tokyo-to, Japan, a joint-stock company of Japan Continuation-in-part of application Ser. No. 231,906, Oct. 22, 1962. This application Mar. 7, 1967, Ser. No. 621,308

Claims priority, application Japan, Oct. 23, 1961, 36/37,983; Apr. 2, 1962, 37/12,585

Int. Cl. H04l 5/22

U.S. Cl. 178—50 7 Claims

ABSTRACT OF THE DISCLOSURE

A time division synchronous system for a plurality of individual synchronous telegraph circuits, in which a time-division multiplex pulse signal obtained by sampling a plurality of input synchronous telegraph signals is applied to a gate circuit to which a gating pulse signal is applied to detect time-divisionally polarities of the synchronous telegraph signals of respective synchronous telegraph circuits aggregated in the time-division multiple pulse signal. The gating pulse signal is inclusive of a plurality of pulse trains each of which has a period equal to the duration of the code element of the corresponding synchronous telegraph signal and displaced, by one half the duration of code element of the corresponding synchronous telegraph signal, with respect to regularized telegraph instants memorized time-divisionally in memory means in the states of binary numbers.

This application is a continuation-in-part application of our pending application Ser. No. 231,906, filed on Oct. 22, 1962, now abandoned.

This invention relates to a time-division synchronous system for a plurality of individual synchronous telegraph circuits, the system being capable of accomplishing in a unified manner the synchronous operations of a plurality of independently operating synchronous telegraph circuits by means of a single terminal apparatus which effects a time-division operation.

In a conventional synchronous telegraphic system, such as a time-division multiplex telegraph system or a telegraph system of the automatic error-correcting type, synchronous signals other than the information signals are not transmitted, and synchronism for receiving the signal of each telegraph circuit is attained by providing each terminal station with a synchronous apparatus which operates by detecting the delay or advance of the transition instant of the signal polarity. Much terminal equipment necessary for such purposes as data transmission and integrating processing of information by means of a computer operate in the same way. In all conventional systems of this type, however, a large number of devices have been required at, for example, the central stations since a corresponding terminal apparatus has been necessary for each of the telegraph circuits. This requires a large floor area for the installation of these devices and involves uneconomical maintenance.

It is an object of the present invention to avoid such disadvantageous features of conventional apparatus.

Said object and other objects of this invention can be attained by a time-division synchronous system, comprising an input sampling means for successively sampling synchronous telegraph signals applied from the plurality of synchronous telegraph circuits to convert them into a time-division multiplex pulse signal; a synchronous pulse generating means comprising means for detecting transtion instants of the synchronous telegraph signal of each synchronous telegraph circuit aggregated in the time-division multiplex signal, memory means for storing time-divisionally phases of regularized transition instants, in the states of binary numbers in a successive time-division manner for each of synchronous telegraph circuit, by use of the detected transition instants, and means for generating a pulse signal inclusive of a plurality of pulse telegraph signal, and displaced, by one half the duration of the code element of the corresponding synchronous telegraph, signal, and displaced, by one half the duration of code element of the corresponding synchronous telegraph signal, with respect to the regularized transition instant memorized in the memory means; a time-division polarity detecting means for gating the time-division multiplex pulse signal by use of the pulse signal generated from the synchronous pulse generating means to detect time-divisionally the polarities of the telegraph signals of respective synchronous telegraph circuits aggregated in the time-division multiplex pulse signal, thereby obtainable of a detected synchronous multiplex pulse signal inclusive of a plurality of synchronous telegraph signals with minimum telegraph distortion; and an output distributing means for distributing the output signal of the time-division polarity detecting means to respective output circuits.

In the accompanying drawings, in which like parts are designated by like reference numerals and letters:

FIGURES 1(A) and 1(B) are block diagrams to illustrate the objects of the invention;

Figure 1A:
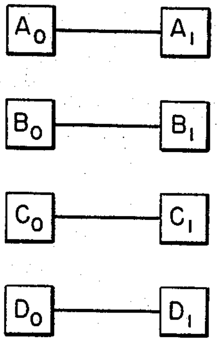
PRIOR ART FIG. 1A
Figure 1B:
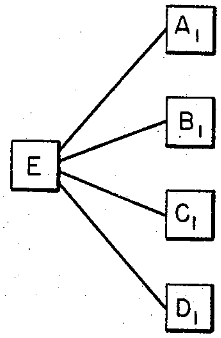

In conventional synchronous telegraphic systems, it has been necessary, when a plurality of synchronous telegraph circuits is to be made, for example, with four terminal equipments $A_1$, $B_1$, $C_1$ and $D_1$ which are being operated independently as indicated in FIGURE 1(A), to provide four terminal equipments $A_0$, $B_0$, $C_0$ and $D_0$. This is because of the necessity of providing separate devices for attaining synchronism for each synchronous telegraph circuit. Each of synchronous telegraph circuits handles usually two or four telegraph circuits of start-stop telegraphy. However, if, as a supposition, the function of the synchronous devices could be practically accomplished by a single apparatus capable of handling all synchronous telegraph circuits, communication will become possible, with respect to a plurality of opposite terminal devices, by means of a single terminal unit E as shown in FIG. 1(B). Such a system has been achieved by the present invention through the adoption of a time-division synchronous system.

Figure 2:
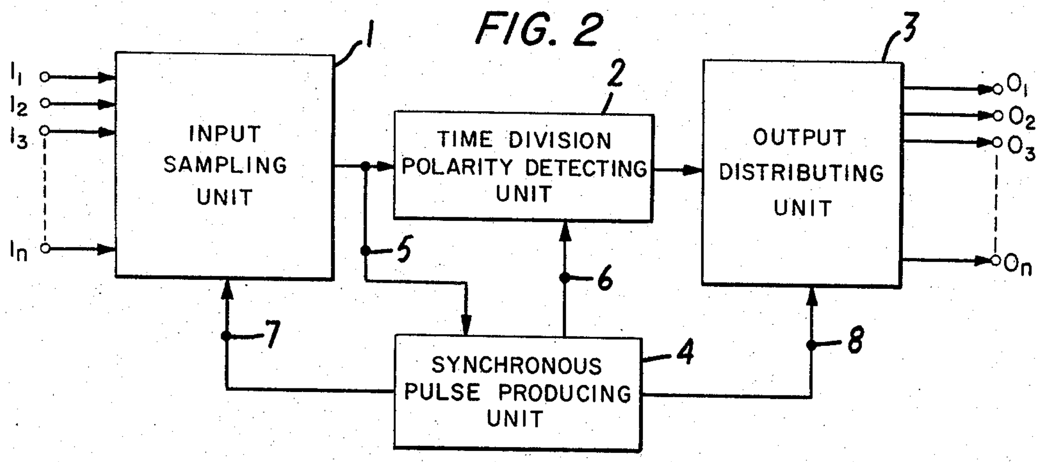
FIGURES 2 and 3 are block diagrams indicating the principle and construction of a time-division synchronous system according to the present invention.

The nature of the invention may best be understood by first referring to the following general description (with reference to FIGURE 2) of the time-division synchronous system according to the invention.

Figure 3:
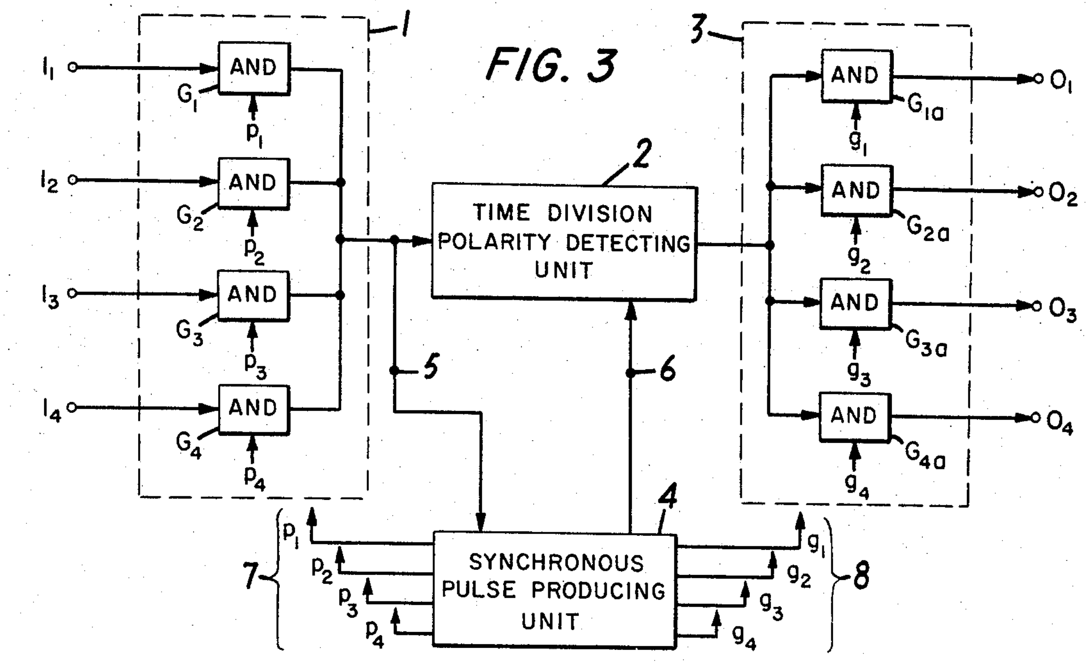

This system includes an input sampling unit 1 which successively samples, in a time-division manner, input telegraph signals $I_1, I_2, I_3 \ldots I_n$ from a plurality of input circuits, thereby to obtain a time-division highway multiple signal (this term being used herein to distinguish it from the synchronous telegraph signals of the input telegraph circuits). In this case, each of the input telegraph signals is a telegraph signal from a synchronous telegraph circuit operating independently. Normally, four channels or two channels are transmitted by such an operation as time division or frequency division, but, of course, simplex telegraphy may be used as are mentioned above. The sampling pulse signals are clock pulses $p_1, p_2 \ldots$ which are produced in a synchronous pulse producing unit 4, which will be described in detail hereinafter with reference to FIGURE 3. In FIGURE 3, $G_1 \ldots G_4$ and $G_{1a} \ldots G_{4a}$ are AND circuits A time-division polarity detecting unit 2 comprises an AND gate circuit by way of example and detects the polarities of the time-division highway multiplex signal which is the output signal of the input sampling unit 1 This detecting is accomplished independently for each telegraph circuit by time-division operation. The pulse signals used for polarity detection are produced in the synchronous pulse producing unit 4 by utilizing the output signal (the time-division highway multiple signal); of the input sampling unit 1, as will be hereinafter described. Because of the use of these pulses, output signals having no telegraph distortion are obtained at the output of the polarity detecting unit 2.

An output distributing unit 3 distributes the time-division highway multiple signals which are the output signal of the time-division polarity detecting unit 2 to corresponding out circuits $O_1, O_2 \ldots O_n$.

The synchronous pulse producing unit 4 produces input sampling pulses, gating pulses and output distributing pulses. The first function of this synchronous pulse producing unit 4 is to detect transition instants of the synchronous telegraph signal of each synchronous telegraph circuit aggregated in the time-division multiplex signal, to store time-divisionally phases of transition instants after regularization, in terms of binary numbers in a successive time-division manner for each synchronous telegraph circuit, by use of the detected transition instants which are usually fluctuated in the transmission path, and to generate the gating pulses inclusive of a plurality of pulse trains each of which has a period equal to the duration of the code element of the corresponding synchronous telegraph signal and is displaced, by one half the duration of the code element of the corresponding synchronous telegraph signal, with respect to the regularized transition instant stored. The gating pulses are supplied to the time-division polarity-detection unit 2. The second function of the unit 4 is to synchronize the input sampling pulses supplied to the input sampling unit 1 and the output distributing pulses supplied to the output distributing unit 3.

Figure 4:
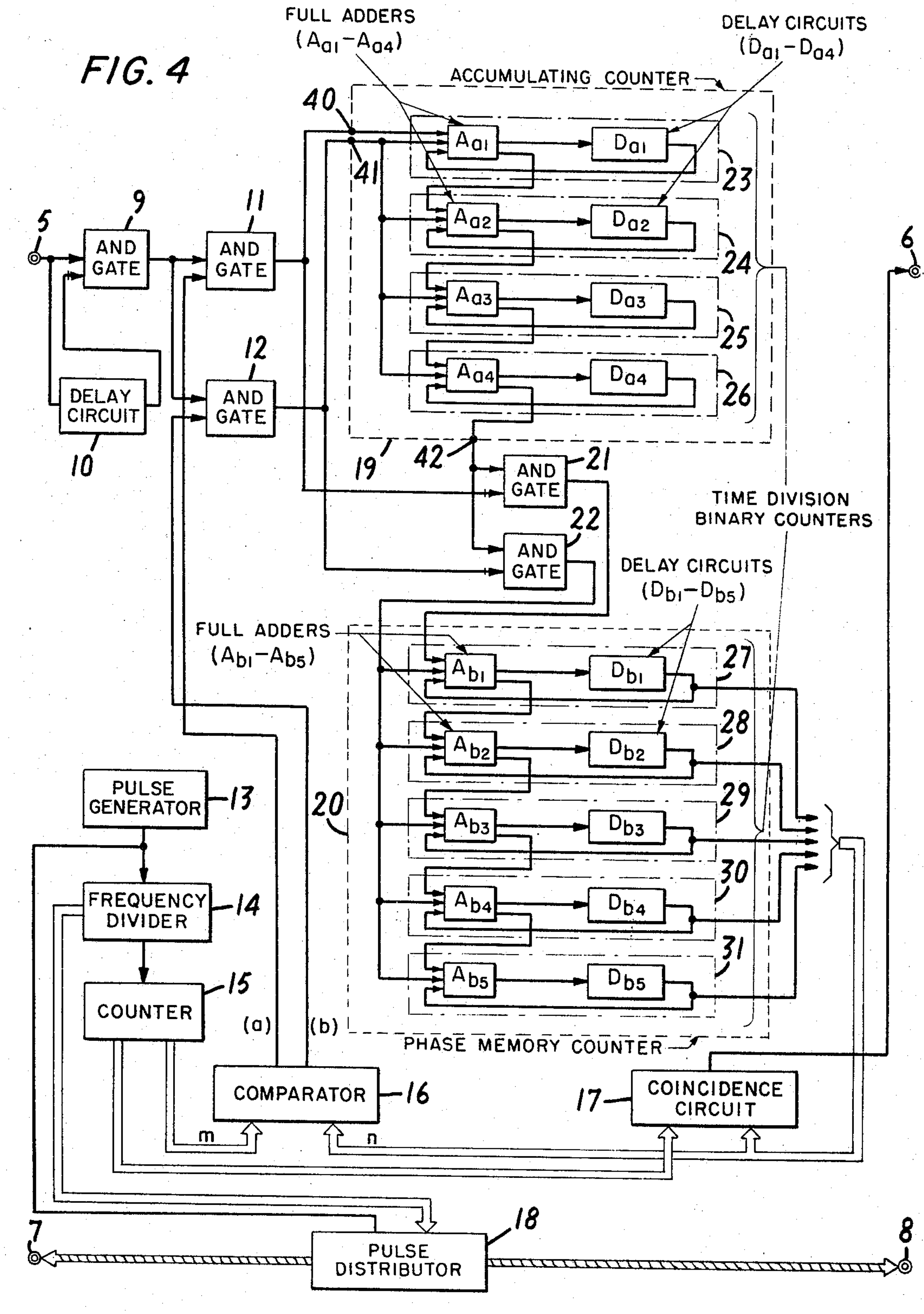
FIGURES 4 and 8 are block diagrams indicating the composition and arrangement of synchronous pulse generating units employed in a time-division synchronous system according to the present invention.
Figure 5A:
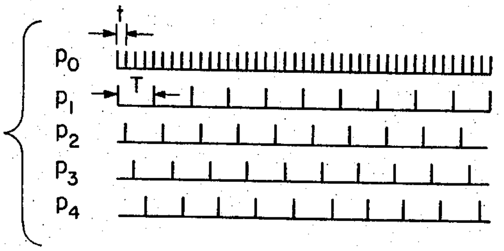
FIGURE 5A is wave form time charts for describing the generation operation of the sampling pulses generated from the synchronous pulse generating unit.
Figure 5B:
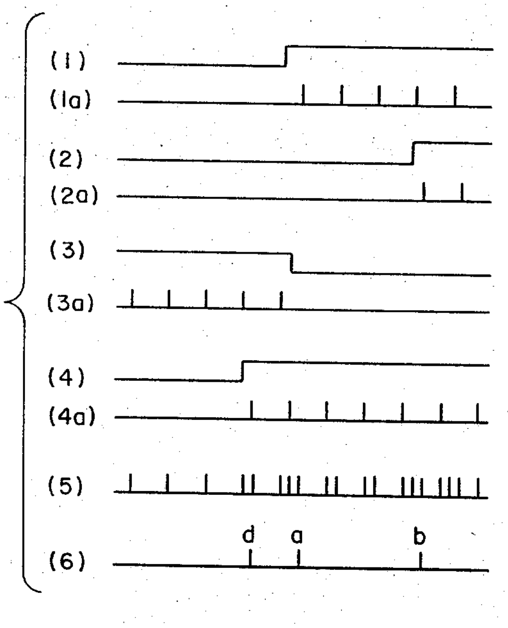
FIGURE 5 is a wave form time chart illustrating the operation of the synchronous pulse generating units of FIGURES 4 and 8.
Figure 6:
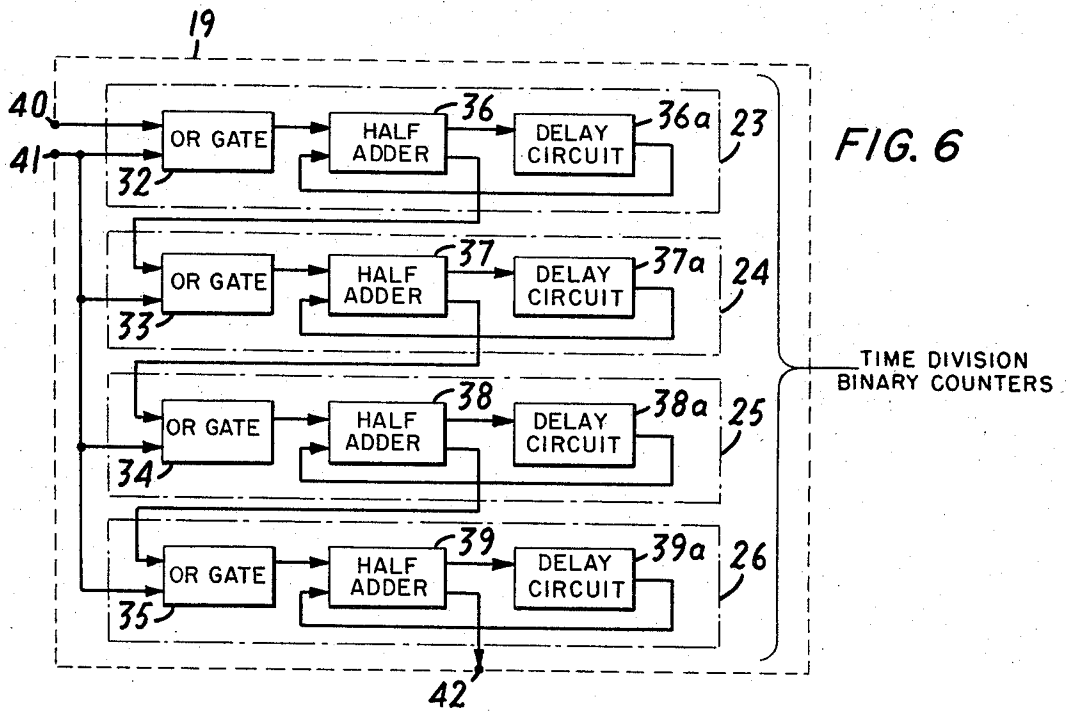
FIGURE 6 is a block diagram indicating another time-division counter used as a component of the synchronous pulse generating unit.

The arangement and operation of the unit 4 will be more clearly apparent from the following description with reference to FIGURES 4, 5 and 6. The following description is disclosed in the case, for example, of four time division channels.

In FIGURE 5(A), the pulse train $P_0$ indicates the pulse train generated by a pulse generator 13 shown in FIGURE 4. The repetition frequency of the pulse train $P_0$ is counted down to a quarter thereof at a frequency divider 14, which is a scale of four counter. This pulse train $P_0$ is distributed by a pulse distributor 18 by the use of four counting states of the divider 14, and pulse trains $P_1$, $P_2$, $P_3$, and $P_4$ each having a period T shown are produced. These are the aforementioned input sampling pulses.

If, as a supposition, the signal speed (modulation rate) of each circuit is 100 Bauds (100 bits/second), and the repetition frequency of each of the sampling pulses, $P_1$, $P_2$, $P_3$ and $P_4$ is 3.2 kilocycles/sec., the number of sampling pulses per element of telegraph signal will be 32, and the repetition frequency of the pulse train $P_0$ will be 12.8 kilocycles/sec. Accordingly, if it is assumed that telegraph signals such as 1, 2, 3 and 4 of FIGURE 5(B) are the aforementioned input signals $I_1$, $I_2$, $I_3$ and $I_4$, sampling will be accomplished in the input sampling unit 1, FIGURE 2, as indicated by 1*a*, 2*a*, 3*a*, and 4*a* of FIGURE 5, thereby the time division highway multiple signal, as shown on the chart 5 of FIGURE 5 can be obtained.

The pulse train 5, (FIG. 5) is applied to one (a terminal 5 of FIG. 4) of the input terminals of an AND gate 9 and, at the same time, is passed through a delay circuit 10 having a delay time equal to the sampling pulse period T, and then it is inverted (NOT) and applied to the other input terminal of the AND gate 9. Thus, the AND gate 9 is caused to close or open by the presence or absence of an output of the delay circuit 10. Accordingly, a pulse is developed on the output side of the AND gate 9, at each instant approximately corresponding to the transition instant from space to mark of each telegraph signal as indicated by the train 6 in FIGURE 5. The pulses (*a*), (*b*), and (*d*) in the train 6 of FIGURE 5 are pulses corresponding to the code transition instants of telegraph signals (1), (2) and (4), respectively. These pulse signals are applied to two AND gates 11 and 12, the control method for which will be described hereinafter.

These pulse signals (*a*), (*b*) and (*d*) pass through either one of the AND gates 11 or 12 and are applied to an accumulating counter 19 and AND gates 21 and 22. The accumulating counter 19 is a scale-of-16 time-division reversible counter comprising four stages of binary counters and carries out addition or subtraction in a time-division manner at each application thereto of pulse signals from the AND gate 11 or the AND gate 12. Each of the time-division binary counters 23, 24, 25 and 26 which compose this accumulating counter 19 is a time-division binary counter composed of a full adder $A_{a1}$ ($A_{a2}$, $A_{a3}$, or $A_{a4}$) and a delay circuit $D_{a1}$ ($D_{a2}$, $D_{a3}$ or $D_{a4}$) having a delay time equal to the sampling pulse period T(1/3.2 milli-second). The sum output terminal of each full adder is connected to the delay circuit of the same stage, and the carry output terminal is connected to the input terminal of the binary counter of the succeeding stage.

From the functional operation point of view, this accumulating counter 19 has an integrating effect with respect to its input pulse signals. Described in greater detail, this counter 19 is a counter in which, at each application of a single input pulse signal from the AND gate 11 or the AND gate 12, its counting operation, which is being carried out in the form of or terms of a binary number, varies by "1." Moreover, since this counter includes delay circuits having delay times equal to the aforesaid sampling pulse period T, this counting operation is carried out in a time-division manner, and it is possible to handle the pulse signals corresponding to four input synchronous telegraph circuits by means of a single counting apparatus unit. More specifically each of the delay circuits is capable of storing, in the delay period T, pulses having space $\tau$ (shown in FIGURE 5A) between adjacent pulses. In the event four telegraph circuits are involved, the number of pulses stored in the delay period T in each delay circuit is four, and the counter 19 assumes, in a time division manner in the period T, four counting states respectively corresponding to four telegraph channels. Each of the four counting states is increased or decreased by "1" every time when a pulse is applied, at the time slot allotted to the corresponding channel, from the AND gate 11 the AND gate 12.

In the present embodiment, the accumulating counter 19 is composed of four binary adders, but the number of counters is not necessarily limited to four. It is possible to increase or decrease this number depending on the desired time constant. In the present case, since the counter 19 is a scale-of-16 counter, if it is assumed that the initial counting state is 0000, the counting state changes to the plus side in the case of a pulse applied from the AND gate 11. Therefore, when sixteen pulses are applied to the counter 19, the counting state returns again to the state 0000, and at this time a carry pulse is produced from the counter 19.

The case in which an output pulse of the AND gate 12 is applied to this counter 19 will now be considered in detail but the operation of a single synchronous telegraph channel is typically described for simple illustration. In this case, since the pulse is applied to all the binary counters 23, 24, 25 and 26, when the pulse is applied at the time of, for example, the state 0000, the operations of all counters are accomplished in such a state that the binary number 1111 is added to the binary number 0000, and therefore the result becomes the state 1111. In this instance, a carry pulse is not produced. When the aforesaid pulse is applied again, the state 1111 is added to the aforesaid state 1111, whereby the counting state becomes 1110, and one carry pulse is produced. The operation thereafter is the same and may be summarized as follows: the counting state of the accumulating counter 19 is successively reduced, by "1," by pulses applied from the AND gate 12; and, since the counter 19 is a scale-of-16 counter, the state 0000 is followed by the state 1111 and a carry pulse is produced at each change of counting state except the change of the state from 0000 to the state 1111.

The actual time-divisional operation of the counter 19 may be understood from the description of a single telegraph channel.

The output pulses (the carry pulses of the counter 26) of this accumulating counter 19 are applied through the AND gates 21 and 22 to a phase memory counter 20. While the path of the pulse to be applied from the AND gate 11 is connected, after inversion, as shown in FIGURE 4 to the AND gate 21. The simultaneous application of the output pulse of the AND gate 11 and the output pulse of the accumulating counter 19 on this AND gate 21, due to the above-described operation, occurs at the time when the counting state of the counter 19 reverts from the state 1111 to the state 0000. On the other hand, the path of the pulse signal to be applied from the AND gate 12 is connected to the AND gate 22; and since the output pulse of the counter 19 is inverted (NOT) and is applied to this gate 22, the creation of the output pulse of the AND gate 22 occurs at the time when the counting state of the counter 19 changes from the state 0000 to the state 1111. At this time the AND gate 12 produces a pulse as described below.

The pulse signal which has been passed through the AND gates 21 and 22 as described above is applied to the phase memory counter 20 and causes its counting state to change. This phase memory counter 20, as is indicated in FIGURE 4, is a time-division scale-of-32 counter composed of five stages of time-division binary counters 27, 28, 29, 30 and 31, each of which comprises a full adder $A_{b1}$, $A_{b2}$, $A_{b3}$, $A_{b4}$, or $A_{b5}$ and a delay circuit having a delay time equal to the previously mentioned period T of the sampling pulses for respective time divisional channels. An input pulse signal applied from the AND gate 21 causes addition operation of the counter 20, and an input pulse signal from the AND gate 22 causes subtraction operation of the counter 20. Since the operation in this case can be readily understood by inference from an application of the operational principle of the above-described accumulating counter 19 to the base-32 case, detailed description thereof is omitted.

The output signal of the counter 20 is derived in the form of the counting state from the binary counter of each state, as indicated in FIGURE 4, and is led, in the form of a binary number and in a time-division manner to a comparator 16 and a coincidence circuit 17.

While, in the foreging description, each of the adders $A_{a1}$, . . . $A_{a4}$ and $A_{b1}$, . . . $A_{b5}$ has been described as a full adder, each of the adders may, as shown in FIGURE 6, also be composed of a combination of an OR gate 32 (33, 34 or 35), a half adder 36 (37, 38 or 39) and a delay circuit 36*a* (37*a*, 38*a* or 39*a*), the inputs of each of the adders $A_{a1}$ . . . $A_{a4}$ and $A_{b1}$ . . . $A_{b4}$ are never applied simultaneously. Although only the accumulating counter 19 is shown in FIGURE 6, the case of the phase memory counter 20 is the same.

Figure 7:
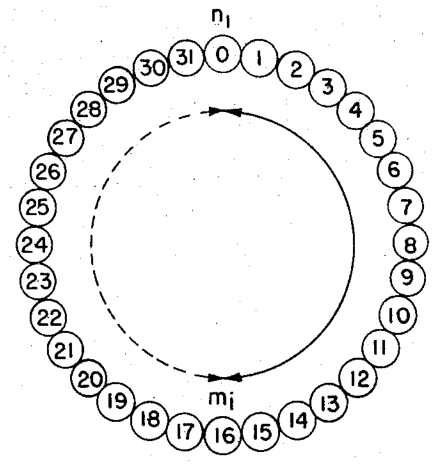
FIGURE 7 is a graph used for describing the operation of a synchronous pulse generating unit.

In the following description the phases of transition instants of respective synchronous telegraph signals are memorized time divisionally in the counter 20. The output signal of the counter 20 is derived in the form of the counting state from the binary counter of each state, as indicated in FIGURE 4, and is led, in the form of a binary number and in a time-division manner for respective synchronous telegraph signals to a comparator 16 and a coincidence circuit 17. The pulse signal to be compared with the output of the phase memory counter 20 in the comparator 16 will now be described. As hereinbefore mentioned, the repetition frequency of output pulses of the pulse generator 13 is divided into a quarter thereof in the frequency divider 14 and is then applied to a counter 15. This counter 15 is a scale-of-32 clock counter composed of five stages of binary counters, and its counting state is, in a manner similar to the output of the aforesaid phase memory counter 20, applied in the form of the counting state of each of the binary counters to the comparator 16. In this comparator 16, a binary number (hereinafter referred to as "$m$") representing the input signal applied from the counter 15 and a binary number (hereinafter referred to as "$n$") representing the input signal applied from the phase memory counter 20 are compared in the form of counting states. Each of the two binary numbers "$m$" and "$n$" can assume values corresponding respectively to thirty-two cases from the counting state 0000 (zero of a decimal number) to the counting state 1111 (31 of a decimal number), and, if the numbers are represented by decimal numbers, they may be indicated as in FIGURE 7. In this case, the binary number "$m$" is a binary number which is caused, by the pulse output of the frequency divider 14, to vary successively in the clockwise direction as shown in FIGURE 7, by one, every $10/32$ ms. On the other hand, the binary number "$n$" is a binary number which, in the period during which the binary number "$m$" is in any of its states, assumes the states of four binary numbers corresponding respectively to four telegraph circuits, in a time-division manner. Since the results of these time-division operations can be readily understood by inference from the operation of only one of the synchronous telegraph circuits, the following description will be directed to that of a single synchronous telegraph circuit for the sake of simplicity of description.

It will first be assumed that the binary number "$n$" is in the state of a decimal number 0 (zero) as indicated by $n_1$ in FIGURE 7. The counting state of the binary number "$m$" indicated in the position opposed to the said $n_1$ will be designated by $m_1$. In this case, comparison of the binary numbers "$m$" and "$n$" is accomplished in the comparator 16, which produces an output ($a$) in the interval during which the binary number "$m$" is transformed from the counting state indicated by $n_1$, in the clockwise direction as viewed in FIGURE 7, to the counting state indicated by $m_1$ (as indicated by the full-line semi-circular arrow). In the interval during which transformation takes place from the counting state indicated by $m_1$, in the clockwise direction, to the counting state indicated by $n_1$ (as indicated by the broken-line, semi-circular arrow), the comparator 16 produces an output (*b*).

When the binary number "*m*" coincides with the counting state indicated by $n_1$, neither of the outputs *a* or *b* is produced.

The foregoing characteristic may be represented, in general, in the form of decimal numbers, as follows:

Output (*a*) is produced when $$16>(m)-(n)>0 \quad (1)$$

or $$-16>(m)-(n)>-32 \quad (2)$$

Output (*b*) is produced when $$32>(m)-(n)>16 \quad (3)$$

or $$0>(m)-(n)>-16 \quad (4)$$

Here, (*m*) and (*n*) are respective values of the binary members "*m*" and "*n*" expressed as decimal numbers. The conditions of the Equations 1, 2, 3 and 4 can be understood analogically by applying the afore-described counting states $m_1$ and $n_1$, generally, to any optional counting state in FIGURE 7.

The operation of the comparator 16 is carried out in a time-division manner and, as afore-described, in such a manner that, for each counting state of the binary number "*m*," the binary numbers "*n*" assumes, in a time-division manner, respective counting states in number corresponding to the number of the synchronous telegraph circuits. Consequently, the outputs *a* and *b* are also determined in a time-division manner and produced in accordance with their respective, time-division, counting states. This output *a* is a signal for opening the afore-mentioned AND gate 11, and the output *b* is a singal for opening the AND gate 12.

To facilitate a clearer understanding of the nature of this invention, an over-all description of the synchronous operation of the synchronous pulse generating unit of the present invention now follows with reference to the foregoing description of respective component parts. For the sake of simplicity of exposition, the following description will be confined to that relative to single synchronous telegraph circuit.

As described hereinbefore, the phase of the transition instant of synchronous telegraph signal of the synchronous telegraph circuit, which has been memorized in the form of the binary number "*n*" in the phase memory circuit 20, and the counting state "*m*" of the counter 15 are compared in the comparator 16, and output *a* or output *b* is produced in accordance with the conditions of the corresponding Equations 1, 2, 3 and 4. Accordingly, the output *a* is a signal which must be judged to be advanced relative to the phase of the transition point of the telegraph circuit memorized in the phase memory circuit 20; and the output *b* is a signal which must be judged to be delayed.

The AND gate 9 and the delay circuit 10 are circuits which detect code transition instants as described above, and their output pulse signals are controlled by the output *a* or output *b* and pass through the AND gate 11 or the AND gate 12. Accordingly, a code transition instant pulse which passes through the AND gate 11 is an information signal which is employed for causing to advance the phase of the transition instant of a corresponding time division channel.

In direct contrast, the code transition instant pulse which passes through the AND gate 12 is an information signal which is employed for causing to delay the phase of the transition instant of a corresponding time-division channel memorised in the phase memory circuit 20.

As previously mentioned, these pulse signals, after being accumulated by the integrating effect of the accumulating counter 19, cause the phases of the transition instants of the signal of the synchronous telegraph circuit memorized as a binary number in the phase memory circuit 20 to advance or to delay successively in a time division manner one by one. By operation hereinbefore described, the phases of the transition instants of signals in the synchronous telegraph circuits are regularized into respective correct phases and continually and faithfully memorized in the form of binary numbers in the phase memory circuit 20. Although this operation is actually carried out in a time-division manner, it can be readily understood analogically from the foregoing description.

The coincidence circuit 17 will now be described in detail. The input signals of this circuit 17 are the counting states of the phase memory counter 20 and the counter 15 signals.

In this case only the highest digits of each of the binary numbers in the counting state of the counter 15 is inverted prior to being fed to the coincidence circuit 17. As a result of these conditions, only when the two counting states of the inputs coincide (at this instant the coincidence circuit 17 generates an output pulse thereof), is the relationship between the counting states of the two inputs that of mutual opposition as indicated by the relationship of, for example, $n_1$ and $m_1$ as shown in FIGURE 7. Moreover, from the consideration of the fact that thirty-two sampling pulses correspond to one element of the telegraph signal, it will be seen that the output pulse signal having a period T of the coincidence circuit 17 is produced with a phase which is out-of-phase by one half of the duration of one element of the synchronous telegraph signal from the phase corresponding to the regularized code transition instants of the synchronous telegraph signal of each synchronous telegraph circuit. In practice this circuit also undergoes time-division operation, and this output signal is applied through a terminal 6 as a polarity detecting pulse (gate pulse) to the afore-mentioned time-division polarity detecting unit 2, in which polarity detection is accomplished in substantially the center of each element of the telegraph signal of each telegraph circuit. Through the utilization of pulse signals obtained by the polarity detection accomplished in this unit 2, and by using bi-stable circuits, such as flip-flop circuits, which are connected to each output terminal of the output distributing unit, input telegraph signals are distributed to corresponding output telegraph circuits.

The pulse distributor 18 is a circuit which, by the utilization of the counting state of the frequency divider 14, distributes the output pulses of the pulse generator 13 as respectively corresponding gate pulses to the input sampling unit 1 and the output distributing unit 2.

Figure 8:
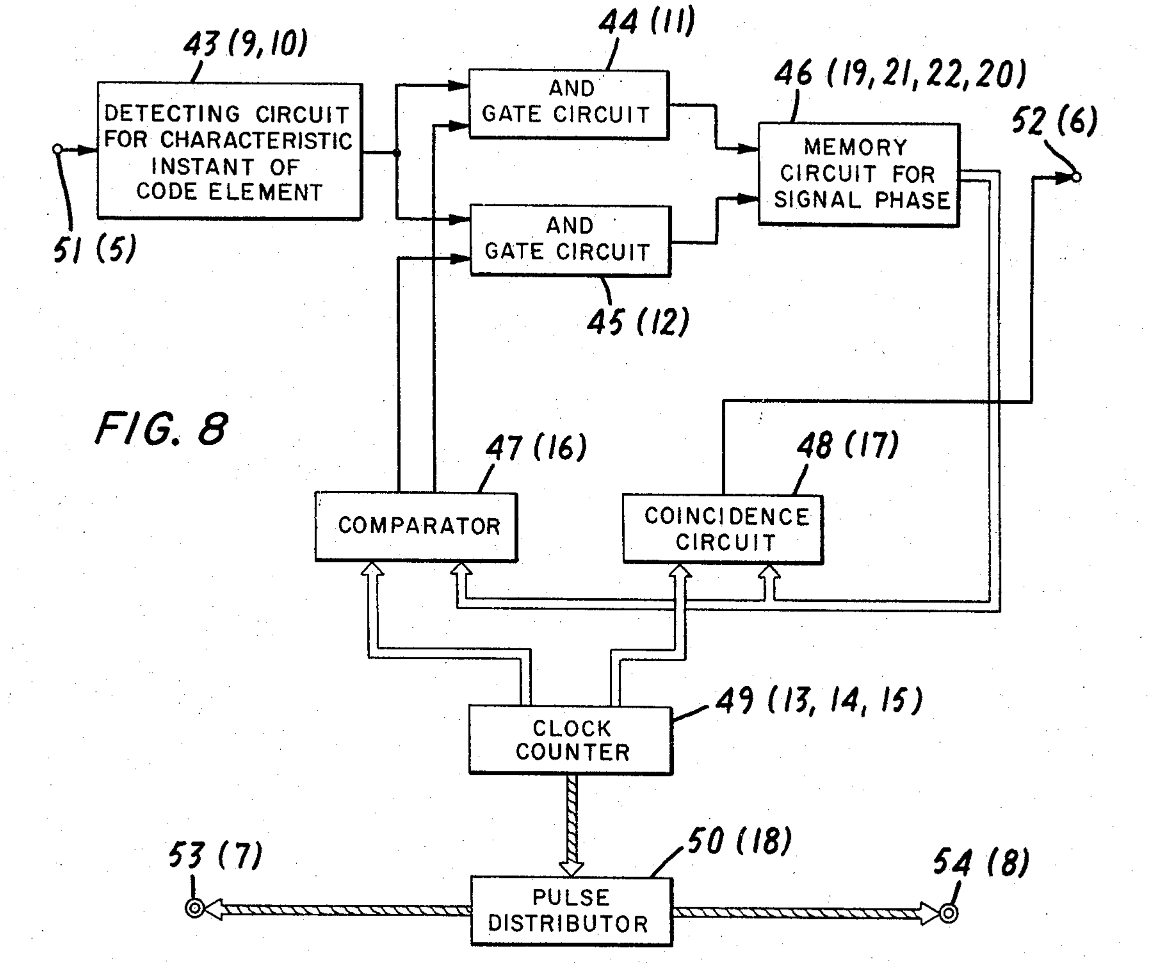

The instant synchronous pulse generating unit 4 may be represented by an inclusive block diagram as illustrated in FIGURE 8. In the arrangement of FIGURE 8, the afore-mentioned AND gate 9 and the delay circuit 10 are substituted by a circuit 43 for detecting, in a time-division manner, the transition instant of each telegraph circuit in the output pulse signal (the time-division multiplex signal) of the input sampling unit 1. The AND gates 11 and 12 are the same as AND gates 44 and 45, respectively. The accumulating counter 19, the AND gates 21 and 22, and the phase memory counter 20 are replaced by a signal phase memory circuit 46, which is for the purpose of memorizing, in a time-division manner, for each telegraph circuit, and in the form of a binary number, the phase of the regularized transition instant of the signal of each telegraph circuit through the utilization of the output pulse signals of the two AND gates 44 and 45. Furthermore, the pulse generator 13, the frequency divider 14, and the counter 15 are replaced by a clock counter 49, which is for the purpose of generating a signal to be standard of the time-division operation of the instant system. The comparator circuit 16, the coincidence circuit 17, and the pulse distributor 18 are respectively the same as their counterparts 47, 48 and 50. Terminals 51, 52, 53 and 54 are respectively connected to the highway, the polarity detecting unit 2, the input sampling unit 1, and the output distributing unit 3.

As mentioned above, the time-division synchronous system of this invention is a single apparatus in which the polarities of synchronous telegraph signals applied from a plurality of synchronous telegraph circuits are time-divisionally detected and the telegraph distortion of the synchronous telegraph signals are simultaneously eliminated in a time-divisional manner for each synchronous telegraph signal.

In order to indicate still more fully the nature of the present invention, the following description of an embodiment in which the time-division, synchronous system according to the invention is applied to a conventional ARQ communications system is set forth. The terminal station of a conventional synchronous-type ARQ system has, in addition to the synchronous receiving function possessed by ordinary synchronous-type terminal equipment, automatic re-transmission requirement function. For this reason, such function as a character-memorizing function, a code-conversion function, and an error-detecting function are required, but since these functions are attained through a combined circuit consisting of a memory circuit and a logical circuit, a logical circuit can be operated by pulses and used in a time-division manner. For this purpose, it is necessary to increase the capacity of the memory circuit.

Figure 9:
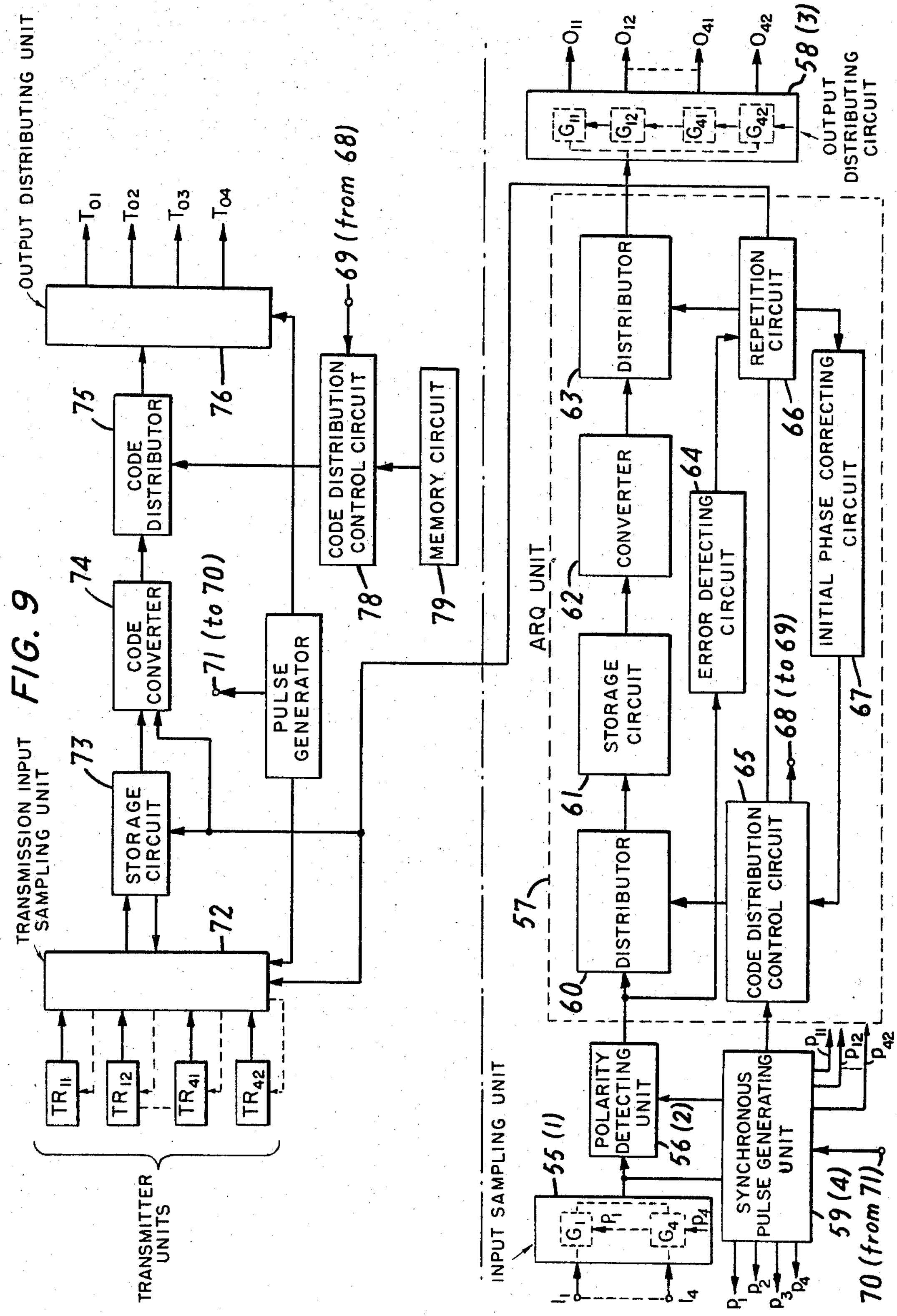
FIGURE 9 is a block diagram indicating an application of a time-division synchronous system according to the invention to a ARQ terminal equipment.

FIGURE 9 shows an example in which the present invention is applied to a conventional ARQ synchronous telegraph system. In this case, the telegraph circuits, operating independently, are four in number, and each circuit is a case of time-division multiplexing of two channels. The part of the system below the dot-and-dash line is the receiving side, and the upper part is the transmitting side. The present embodiment illustrates the composition of a master station, but may, in the case of a slave station, be so adapted that the sampling pulses of the transmitting side are produced by utilizing the synchronous pulses generated on the receiving side.

The arrangement and operation of this example, beginning from the transmitting side, will now be considered. In a transmission input sampling unit 72, a signal sent out from a 5-unit transmitter $TR_{11}$, $TR_{12}$ . . . $TR_{41}$, $TR_{42}$ in converted into a serial time-division signal. Sets of transmitters ($TR_{11}$, $TR_{12}$), . . . or ($TR_{41}$, $TR_{42}$) compose the respective synchronous telegraph channels. The input and output lines of the input sampling unit 72 may be either of the two-wire system type or the 5-wire system type. The serial time-division signal is stored, three characters at a time, in a three-character storage circuit 73, which is composed of logical circuits and a plurality of delay circuits, and in which the signal is stored in a time-division manner. Reference numeral 74 designates a code converter which converts 5-unit codes, which are its input signal, into 7-unit codes. In the instant embodiment, this input signal is of the 5-wire system, and its output signal is of the 7-wire system type. In this converter 74, single circuit is used in a time-division manner. The output signal, of the 7-wire system type, of the code converter 74 is converted into a signal of the two-wire system type by a code distributor 75, which is a circuit connected to an output distributing unit. Since the control of the code distributing circuit 75 is accomplished independently for each telegraph circuit, a code distribution control circuit 78, connected to the code distributing circuit 75, is formed by a time-division counting circuit. This code distribution control circuit 78 is controlled by a control signal from the receiving side and a memory circuit 79, which is a circuit provided for the purpose of memorizing the distinction between a master station and a slave station and the delay time due to the propagation time. A pulse generator 71 is provided to generate pulses which become the standard of the time-division operation of the ARQ system utilizing this time-division synchronous system and corresponds to the pulse generator 13 mentioned hereinbefore. When a signal for repetition is applied from the receiving side, the storage circuit 73 and the code converting circuit 74 stop sending out drive pulses to the input circuits, repeating and sending out the three-character signals stored in the storage circuit 73 for each telegraph circuit in a time-division manner. Through the above-described operation, respectively corresponding telegraph signals of 7-unit synchronous type are obtainable at the output terminals of a transmission output distributing unit 76. In this case, a bistable circuit such as flip-flop circuit is used inside or outside of the output distributing unit, and the aforesaid telegraph signal are produced.

The receiving side of the instant system will now be described. The input sampling unit 55, polarity detecting unit 56, output distributing unit 58, and synchronous pulse generating unit 59 are exactly the same as the corresponding units described hereinbefore with reference to FIGURE 2. In the example shown in FIGURE 9, an ARQ unit 57 having the function of correcting, in a time-division manner for each telegraph circuit, the initial phase for reception of signal of each telegraph circuit, the function of detecting, in a time-division manner for each telegraph circuit, erroneous characters of each telegraph circuit and automatically requiring the opposite transmitting side to re-transmit, the said characters being received as erroneous characters, and the function of converting 7-unit codes to 5-unit codes is additionally provided between the polarity detecting unit 56 and the output distributing unit 58.

The ARQ unit 57 comprises a distributor 60, a storage circuit 61, a converter 62, a distributor 63, an error detecting circuit 64, a code distribution control circuit 65, a repetition circuit 66, and an initial phase correcting circuit 67 arranged as indicated in FIGURE 9. The distributor 60 is a circuit which distributes time-division highway multiplex signals into signals of a 7-line system type, and in which signal circuit is used with time-division operation. In the storage circuit 61, the output signals of the distributor 60 are stored in a time-division manner, characters corresponding to one letter as a time, and here, serial signals are caused to be in step as signals of 7-line system type. In the converter 62, the 7-unit codes are converted into 5-unit codes, which are then applied through the 5-line system to the distributor 63. This distributor 63 converts the 5-unit codes applied through the 5-line system into serial, 2-line system type codes and sends these codes to the output distributing unit 58. In the converter 62 and distributor 63, a single circuit is used in a time-division manner.

The error detecting circuit 64 consists of a time-division error counting circuit for detecting errors in signal of each telegraph circuit through utilization of the output signals of the afore-mentioned polarity detecting unit 56. The code distributor control circuit 65, which consists of a time-division counter, memorizes the phase of the period for every character of each telegraph circuit and sends signal output to the aforesaid distributor 60 to maintain the operation thereof in an accurate manner. Moreover, this signal output is applied also to the code distribution control circuit of the transmitting side. The repetition circuit 66 is composed of a memory device for memorizing the repetition state of each telegraph circuit and a logical circuit which is common to all telegraph circuits, and the circuit 66 produces control signals for effecting repetition by means of the output signals of the error detecting circuit 64 and the code distribution control circuit 65. These output signals temporarily stop the operation of the distributor 63 and cause signals for effecting repetition to be sent to the transmitting side as indicated in FIGURE 9. The initial phase correcting circuit 67 is a circuit which, under the control of one of these output signals, accurately corrects the phase of the period of each character of each telegraph circuit which has been memorized in the memory circuit, and which is formed by a time-division counting circuit for the purpose of memorizing different states of each telegraph circuit.

Although in the above described embodiment, an example of application of the time-division synchronous system according to the present invention to an ARQ system in practical use in international telegraph lines has been described, any desired number of multiplex channels may be used, with respect to individual telegraph circuits, each of which transmits synchronous telegraph signals.

What we claim is:

1. A time division synchronous system for a plurality of individual synchronous telegraph circuits, comprising an input sampling means for successively sampling synchronous telegraph signals applied from said plurality of synchronous telegraph circuits to convert them into a time-division multiplex pulse signal; a synchronous pulse generating means comprising means for detecting transition instants of the synchronous telegraph signal of each synchronous telegraph circuit aggregated in the time-division multiplex signal, memory means for storing time-divisionally phases of regularized transition instants, in the states of binary numbers in a successive time-division manner for each of synchronous telegraph circuit, by use of the detected transition instants, and means for generating a pulse signal inclusive of a plurality of pulse trains each of which has a period equal to the duration of the code element of the corresponding synchronous telegraph signal and displaced, by one half the duration of code element of the corresponding synchronous telegraph signal, with respect to the regularized transition instant memorized in the memory, means, a time-division, polarity detecting means for gating the time-division multiplex pulse signal by use of the pulse signal generated from the synchronous pulse generating means to detect time-divisionally the polarities of the telegraph signals of respective synchronous telegraph circuits aggregated in the time-division multiplex pulse signal, thereby obtainable of a detected synchronous multiplex pulse signal inclusive of a plurality of synchronous telegraph signals with minimum telegraph distortion; and an output distributing means for distributing the output signal of the time-division polarity detecting means to respective output circuits.

2. A time-division synchronous system according to claim 1 wherein the said synchronizing pulse generating unit comprises a clock counter for generating signals to be used as the standard signal for the time-division operation of the said system; a code transition instant detecting circuit for detecting, in a time-division manner for each telegraph circuit, the code transition instant of each telegraph circuit in the output pulse signals of the said input sampling unit; two AND gate circuits for controlling the passage of the output pulse signals of the said code transition instant detecting circuit; a signal phase memorizing circuit for memorizing in a time-division manner for each telegraph circuit the phase, in the state of a binary number, of the signal transition instant of each telegraph circuit through utilization of the output pulse signals of the said two AND gate circuits; a coincidence circuit for generating an output pulse signal, in a time-division manner for each telegraph circuit, only when a signal corresponding to the binary number resulting by inverting the highest digit of a binary number memorized in the said signal phase memorizing circuit coincides with an output signal of the said clock counter, and for supplying said output pulse signals to the time-division polarity detecting unit, a comparator for sending, in a time-division manner for each telegraph circuit, a pulse signal to the corresponding one AND gate circuit of the said two AND gate circuits, the said one AND gate circuit being determined by the delay or advancement of the phase of output signal of a code frequency memorizing circuit with respect to the phase of signal of the said clock counter; and a pulse distributor for distributing and supplying the output signals of the said clock counter to the corresponding terminals of the said input sampling unit and to the corresponding terminals of the output-distributing unit.

3. A time-division synchronous system according to claim 2 wherein the said signal phase memorizing circuit is constructed by using a plurality of time-division counters, each comprising an OR gate circuit, a half adder, and a delay circuit.

4. A time-division synchronous system according to claim 2 wherein the code frequency memorizing circuit is constructed by using a plurality of time-division counters, each comprising a full adder and a delay circuit.

5. A time-division synchronous system according to claim 1, applied to an ARQ apparatus and provided, in addition to the said four units, with an ARQ unit having means for correcting, in a time-division manner for each telegraph circuit, the initial phase for reception of each telegraph circuit, means for detecting, in a time-division manner for each telegraph circuit, errors of each telegraph circuit and automatically demanding repetition for the correspondingly opposite transmitting side, and means for converting 7-unit codes into 5-unit codes, the said ARQ unit being provided between the said time-division polarity-detecting unit and the said output-distributing unit.

6. A time-division synchronous system according to claim 5 wherein the said ARQ unit comprises a first means for distributing, in a time-division manner for each telegraph circuit, serial codes which are the output signals of the said time-division polarity-detecting unit into 7-unit codes; a second means for storing the output signals of the said first means, in a time-division manner for every character at a time, for each telegraph circuit; a third means for converting, in a time-division manner for each telegraph circuit, 7-unit codes which are the output signals of the said second means into 5-unit codes; a fourth means for distributing, in a time-division manner for each circuit, the 5-line system output signals of the said third means into serial, 2-line system, 5-unit codes and supplying the said codes to the said output-distributing unit; a fifth means for detecting, in a time-division manner for each circuit, errors in the output signal of the said time-division polarity-detecting unit; a sixth means for memorizing, in a time-division manner, the initial phase of each telegraph circuit through utilization of the signals supplied from the said synchronous pulse-generating unit and controlling the said first means; a seventh means having terminal for sending out, through utilization of the output signals to the said fifth means and the said sixth means, control signals for controlling, in a time-division manner, the said fourth means and, at the same time, for causing the correspondingly opposite transmitting side to repeat transmission automatically in the time-division manner; and an eighth means for correcting, through utilization of the output signals of the said seventh means, the initial phases memorized in the said sixth means.

7. A time-division synchronous system according to claim 5 wherein, in addition to the said four units to be used as the receiving side, there is provided in the local transmitting side a transmitting time-division ARQ apparatus comprising a transmitting-side input-sampling unit in the transmitting side for converting signals applied from a plurality of independently operating telegraph circuits into time-division multiplex signals of a highway in order to transmit to the opposite transmitting side; an ARQ unit of the transmitting side inserted in the said highway connected to the said input-sampling unit in the transmitting side and storing, in a time-division manner for each telegraph circuit, *n* characters at a time and, at the same time, means for sending out in a time-division manner for each telegraph circuit the said stored characters under the control of control signals applied from the said ARQ unit of the local receiving side, means for converting in a time-division manner for each telegraph circuit 5-unit codes into 7-unit codes, an output-distributing unit in the transmitting side for distributing the output signals of the said transmitting-side ARQ unit to a plurality of corresponding output circuits, and a synchronous pulse generating unit which is connected to the input-sampling unit and to the transmitting output distributing unit in the transmitting side for connecting, independently and in a time-division manner, each input telegraph circuit and the corresponding output telegraph circuit by synchronising the input circuit sampling pulses in the said transmitting input sampling unit and the distributing pulses of the output circuits corresponding to the said input circuits in the said transmitting output-distributing unit.

References Cited

UNITED STATES PATENTS

| | | |
|---|---|---|
| 2,575,268 | 11/1951 | Griffith. |
| 2,682,574 | 6/1954 | Canfora. |
| 2,716,158 | 8/1955 | Shenk. |
| 2,845,489 | 7/1958 | Johnson. |
| 3,156,757 | 11/1964 | Van Duurn. |
| 2,973,511 | 2/1961 | McLaughlin. |

THOMAS A. ROBINSON, Primary Examiner

U.S. Cl. X.R.

178—58; 340—147